(12) United States Patent
Vucetic et al.

(10) Patent No.: US 8,323,073 B2
(45) Date of Patent: Dec. 4, 2012

(54) METHOD FOR DISCONTINUOUS PROFILE GRINDING

(75) Inventors: Dragan Vucetic, Schwieberdingen (DE); Björn Sander, Stuttgart (DE); Ingo Faulstich, Ludwigsburg (DE)

(73) Assignee: Gleason-Pfauter Maschinenfabrik GmbH, Ludwigsburg (DE)

( * ) Notice: Subject to any disclaimer, the term of this patent is extended or adjusted under 35 U.S.C. 154(b) by 1139 days.

(21) Appl. No.: 12/229,400

(22) Filed: Aug. 22, 2008

(65) Prior Publication Data

US 2009/0053977 A1   Feb. 26, 2009

(30) Foreign Application Priority Data

Aug. 24, 2007 (DE) .......................... 10 2007 040 894

(51) Int. Cl.
*B24B 1/00* (2006.01)
(52) U.S. Cl. ................ 451/47; 409/66; 451/56; 451/58
(58) Field of Classification Search .................. 409/66; 451/47, 51, 56, 61, 58
See application file for complete search history.

(56) References Cited

U.S. PATENT DOCUMENTS

| 4,299,062 | A |   | 11/1981 | Junker |
|---|---|---|---|---|
| 4,993,194 | A | * | 2/1991 | Cadisch ..................... 451/253 |
| 5,339,794 | A | * | 8/1994 | Thyssen .................... 125/11.04 |
| 5,624,301 | A |   | 4/1997 | Lenz et al. |
| 2005/0245176 | A1 | * | 11/2005 | Thyssen ....................... 451/56 |

FOREIGN PATENT DOCUMENTS

| CH | 312330 | 12/1955 |
| DE | 2753469 B2 | 5/1979 |
| DE | 4224703 C1 | 4/1993 |
| DE | 4210710 C2 | 3/2003 |
| DE | 102004020364 A1 | 1/2006 |

OTHER PUBLICATIONS

Official Action from German Patent Office (with English translation) for DE 102007040894.5.

* cited by examiner

*Primary Examiner* — Timothy V Eley
(74) *Attorney, Agent, or Firm* — Robert L. McDowell

(57) ABSTRACT

A gear grinding tool can be trued and re-profiled. The geometry of the individual profiles in the direction of the tool axis is designed so that at least more than two, preferably all, flanks of the tool are used for rough machining of the work piece flanks, and that during finishing the re-profiled flanks provided only for roughing are set back far enough so that during finishing they do not come into contact with the work piece flanks.

8 Claims, 4 Drawing Sheets

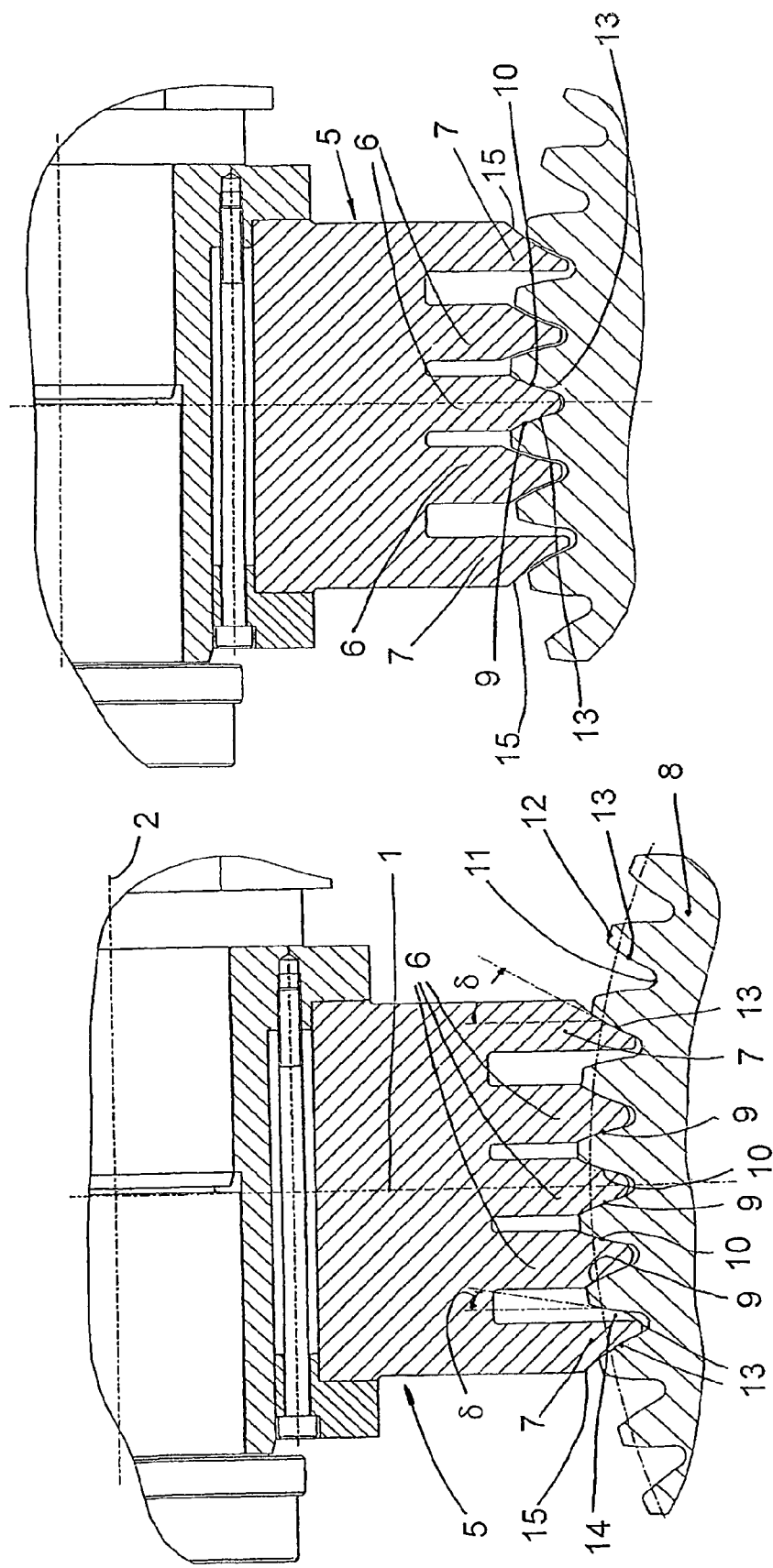

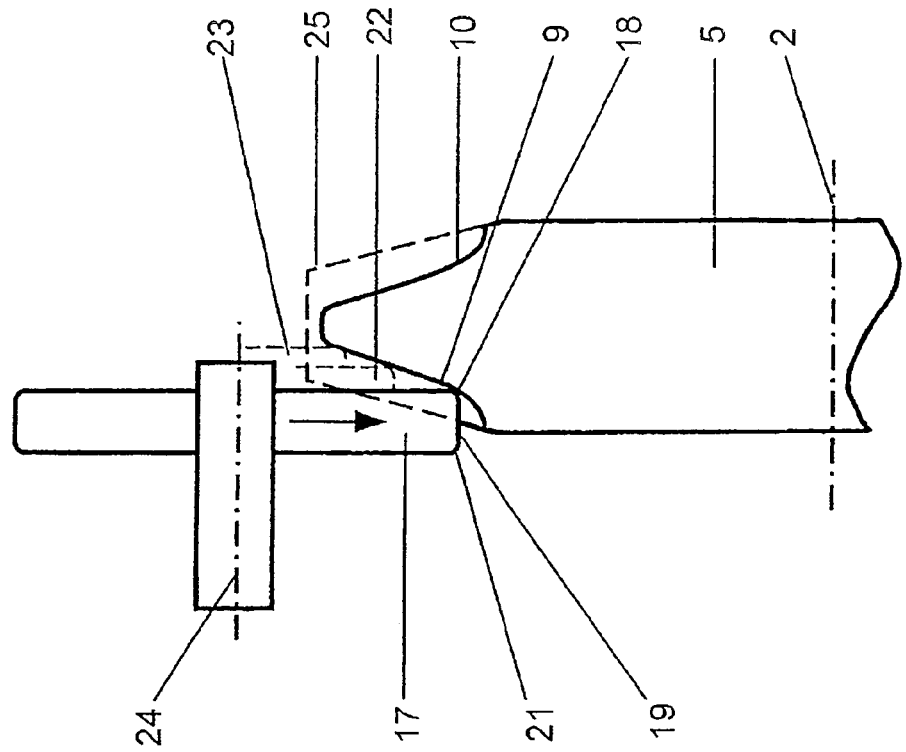
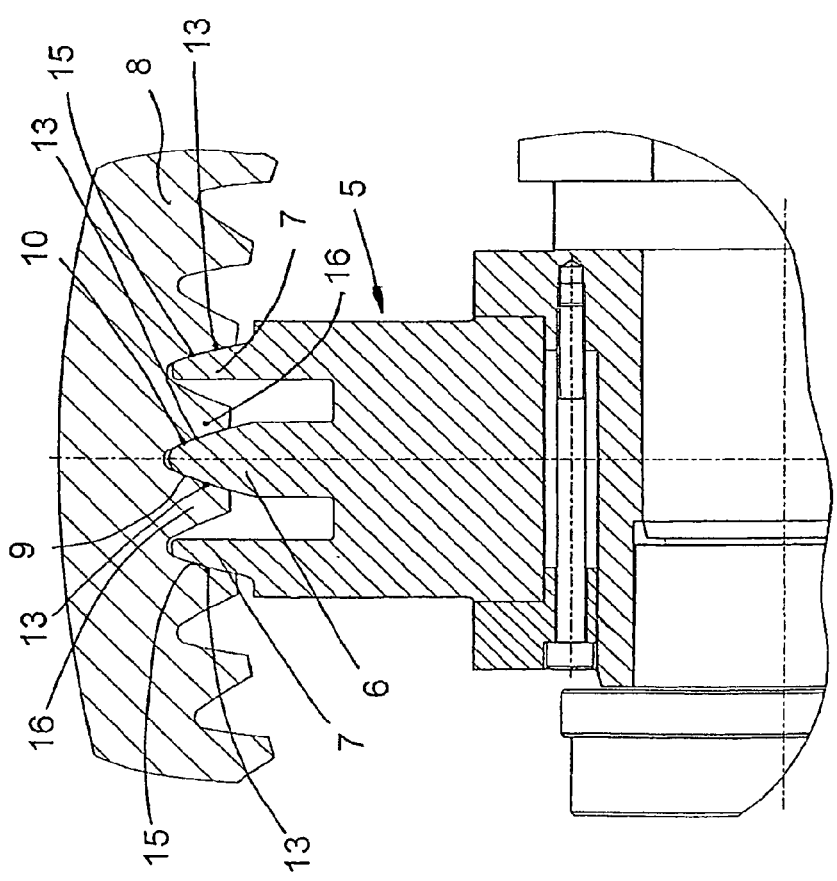

METHOD FOR DISCONTINUOUS PROFILE GRINDING

This application claims the benefit of priority of German Patent Application No. DE 102007040894.5 filed Aug. 24, 2007.

FIELD OF THE INVENTION

The invention relates to a tool for discontinuous profile grinding of externally and/or internally geared cylindrical gears as well as a method for discontinuous profile grinding of externally and/or internally geared cylindrical gears.

BACKGROUND OF THE INVENTION

The inventive method and tool are used for discontinuous profile grinding of cylindrical gears, in particular in the area of work pieces with large dimensions, such as those used, for example, in wind turbine generator systems or in shipbuilding, where gear wheels can have diameters of a plurality of meters. Currently, there is a great demand for these gear wheels. Often, they are very expensive. In many cases, the work pieces are machined by discontinuous profile grinding. There is a demand to machine these gears within a short time without grinding burns. Unfortunately, there are no current limit values for the technological process parameters which, when exceeded, lead to grinding burns. The lack of such limit values creates a lack of process safety.

Tools for discontinuous profile grinding which cannot be trued are known. Such tools are comprised of a plurality of disks and thus represent a tool set. These tools allow a short machining time, but they require a high effort with respect to handling and preparation at the end of the service life and have to be specially designed and produced for each gear geometry. Furthermore, a compromise is required in the selection of the specification of the coating to meet the varying requirements on the tool for rough machining and finishing. Partly because of these deficiencies, these tools are not used in the area of work pieces with large dimensions.

This situation leads to the object to be attained by the invention, which is to develop a method and the required tools to reduce the machining time considerably relative to the state of the art in discontinuous profile grinding of large cylindrical gear wheels and/or to increase the process safety considerably and in doing so, be able to adapt the tools to the respective machining task.

SUMMARY OF THE INVENTION

In accordance with a first aspect of the invention, the tool can be trued and re-profiled. The geometry of the individual profiles in the direction of the tool axis is designed so that at least more than two, preferably all, flanks of the tool are used for rough machining of the work piece flanks, and that during finishing the re-profiled flanks provided only for roughing are set back far enough so that during finishing they do not come into contact with the work piece flanks.

In accordance with another aspect of the invention, the tool is developed so that the flanks provided for finishing are part of disks which have a specification that is especially suited for finishing, whereas the remaining disks of the tool in accordance with the invention have a specification that is especially suited for rough machining. For rough machining, the re-profiled disks provided for finishing are set back far enough so that they do not come into contact with the work piece flanks. For finishing, the re-profiled rough machining flanks are set back far enough that they do not come into contact with the work piece flanks.

In accordance with yet another aspect of the invention, the tool can be trued and re-profiled and for roughing at least more than two flanks are used and after rough machining, the worn parts can be removed from the tool flanks provided for finishing, and the flanks not needed for finishing are re-profiled so that they do not come into contact with the work piece flanks at finishing. After rough machining and/or finishing of a group of work piece flanks, the work piece is rotated by the number of tool flanks active during rough machining and/or finishing, divided by two.

In accordance with still another aspect of the invention, the tool can be trued and re-profiled wherein only two flanks, which belong to one disk, are used for finishing of the work piece. This disk has a specification that is especially suitable for finishing, whereas the remaining disks have a specification that is especially suitable for rough machining. For rough machining, the re-profiled disk provided for finishing is set back far enough for rough machining that the disk does not come into contact with the work piece flanks. For finishing, the rough machining flanks by re-profiling are set back far enough that they do not come into contact with the work piece flanks.

In accordance with a further aspect of the invention, the tool can be trued and re-profiled wherein only flanks are used for finishing, which belong to at least two disks. The disks have a specification that is especially suited for finishing, whereas the remaining disks have a specification that is especially suited for rough machining. The re-profiled disks provided for finishing are set back far enough for rough machining that they do not come into contact with the work piece flanks. For finishing the rough machining flanks by re-profiling are set back far enough that they do not come into contact with the work piece flanks.

It is also possible to use separate tools for rough machining and finishing.

BRIEF DESCRIPTION OF THE DRAWINGS

FIG. 3 shows a tool in accordance with the invention with three wide and two narrow disks, during rough machining.

FIG. 4 illustrates the tool of FIG. 3 during finishing, with the tool flanks used for finishing belonging to the same disk.

FIG. 7 presents a tool in accordance with the invention, comprised of one wide and two narrow disks, during rough machining of an internal gearing.

FIG. 8 schematically illustrates the profiling process of the tool by means of a truer, using the example of a wide disk.

DETAILED DESCRIPTION OF THE INVENTION

Figure 1:
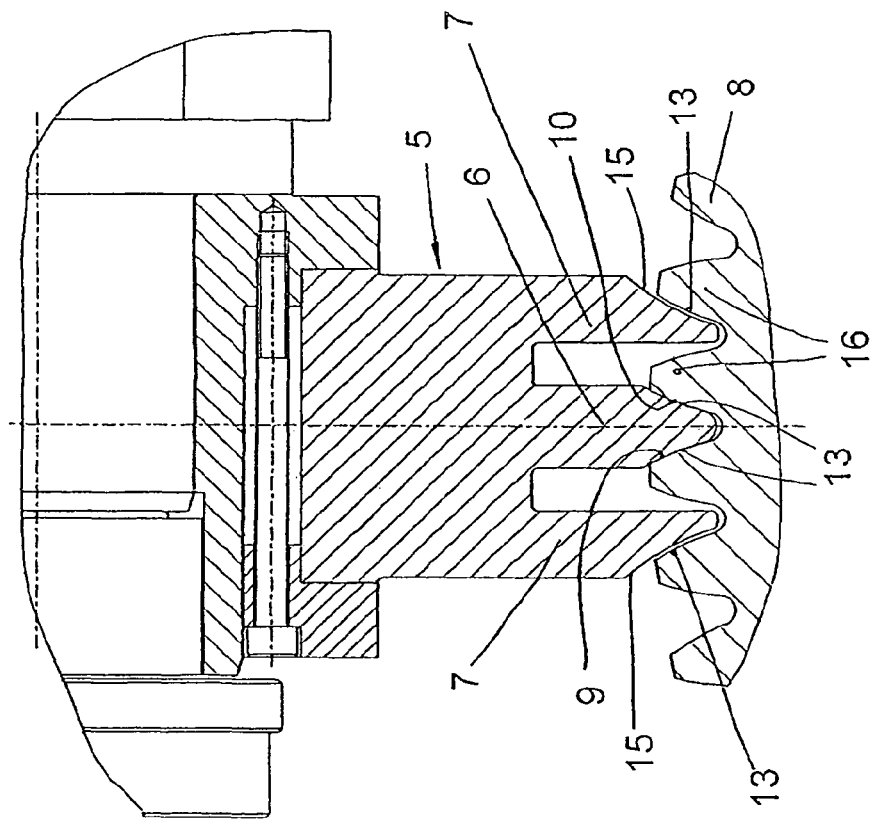
FIG. 1 illustrates a tool in accordance with the invention having one wide and two narrow disks during rough machining.
Figure 2:
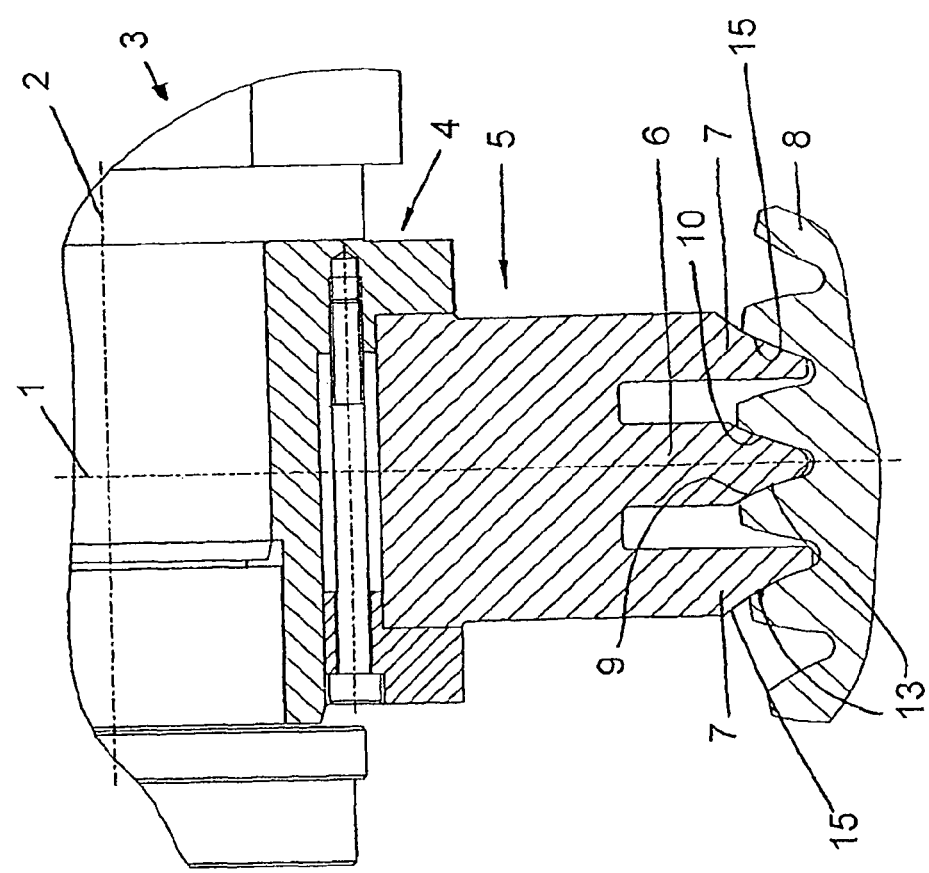
FIG. 2 shows the tool of FIG. 1 during finishing, with the tool flanks used for finishing belonging to the same disk.

The invention will now be discussed in detail with reference to the accompanying drawings which are offered by way of example only. Although FIGS. 1 to 7 show the tools in engagement with a spur-geared work piece, it is to be understood that the tools can also be used for machining helical gears. While FIGS. 1 to 7 show tools having a common basic body, the invention contemplates the tools being assembled from separate disks. In the discussion below, disks that can work with two flanks are referred to as "wide disks." Other disks have only one respective flank suitable for grinding and are referred to as "narrow disks."

In accordance with the state of the art, only one profiled grinding disk is used in the area of work pieces with large dimensions. To that end, the disk is adapted to the requirements of both the rough machining and the finishing processes by selecting favorable technological values for truing. To keep the production time as small as possible, the highest possible relative volume removal rate is used. With an increasing volume removal rate, the grinding burn risk increases as well. In practice, these contradictory effects of the relative volume removal rate represent a big problem.

With respect to the relative volume removal rate, it is not a characteristic value that represents a clear limit for the formation of grinding burn. This applies even in the case that all known influences for the formation of grinding burn, such as hardness of the work piece, advancing of the disk, coolant lubricant, etc., for example, are held constant. Nevertheless, this variable is used in practice because to date, there is no variable for the assessment of the process that is more suitable.

The following shows a way of lowering the production time and thus the machining time and/or reducing the grinding burn risk. Whereas only two tool flanks are available according to the state of the art, which perform the cutting simultaneously, clearly more tool flanks are in simultaneous engagement with the work piece using the tool in accordance with the invention and the method in accordance with the invention, in particular during rough machining. When assuming a constant allowance at all flanks of the work piece and working in accordance with the invention under technological conditions corresponding to the state of the art, the production time during rough machining changes by the factor 2 divided by the number of tool flanks active during rough machining when using the tool in accordance with the invention and the method in accordance with the invention. This applies to spur gearing. In the machining of helically geared cylindrical gears, the production time can also be reduced considerably.

The advantage of the invention is emphasized by the fact that with the large work pieces discussed here, the part of the production time required for rough machining is clearly greater than the part required for finishing. The saved production time can be used to machine the work piece in a shorter time compared to the state of the art. It is also possible to retain the production time corresponding to the state of the art and reduce the risk of grinding burn in this way. In practice, one would realize a combination of the two measures and thus reduce production time and grinding burn risk to a certain amount.

FIGS. 1 to 7 show schematic representations of differently designed tools 5. The tools 5 are held on a tool spindle 3 which is rotatable around an axis 2. The reference 1 refers to the machine center. The tool 5 is accommodated in a tool holder 4. In the embodiment according to FIGS. 1 and 2, the tool has a wide disk 6 that is positioned symmetrically between two narrow disks 7. The tool 5 is designed in mirror-symmetric fashion relative to the machine center 1. The center, wide disk 6 has two flanks 9, 10, whereas the two narrow disks 7 each have only one flank 15 suitable for grinding. In the rough machining process shown in FIG. 1, the flanks 9, 10 and 15 of the tool 5 machine the flanks 13 of the work piece 8, which is an externally geared work piece.

In the rough machining process according to FIG. 1, all tool flanks 9, 10, 15 are in engagement with the work piece flanks 13. During finishing (FIG. 2), only the tool flanks 9, 10 of the wide disk 6 are machining the work piece flanks 13, whereas the tool flanks 15 of the narrow disks 7 are spaced apart from the work piece flanks 13 by re-profiling. With this tool 5, finishing is performed simultaneously with the two tool flanks 9, 10 of the wide disk 6, which machine the work piece flanks 13 of adjacent teeth 16 of the work piece 8. Therefore, finishing of the work piece 8 represents the same situation as with the state of the art. For this reason, the flank modifications known from the state of the art can also be generated with known means.

Figure 5:
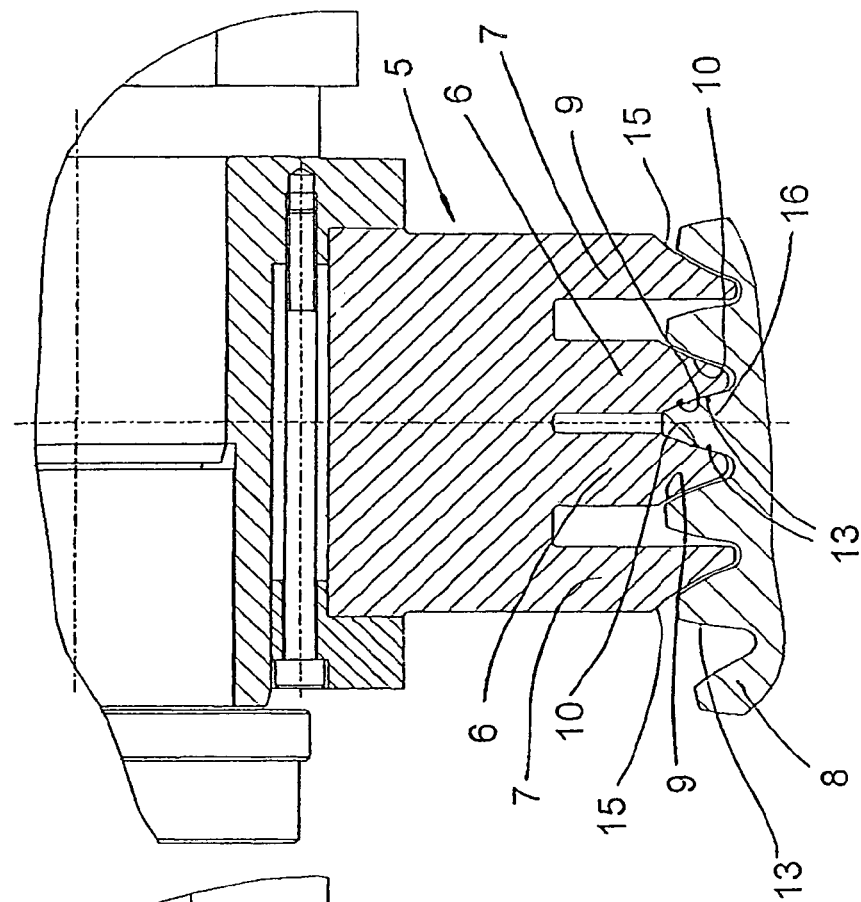
FIG. 5 illustrates a tool in accordance with the invention comprised of two wide and two narrow disks, during rough machining.
Figure 6:
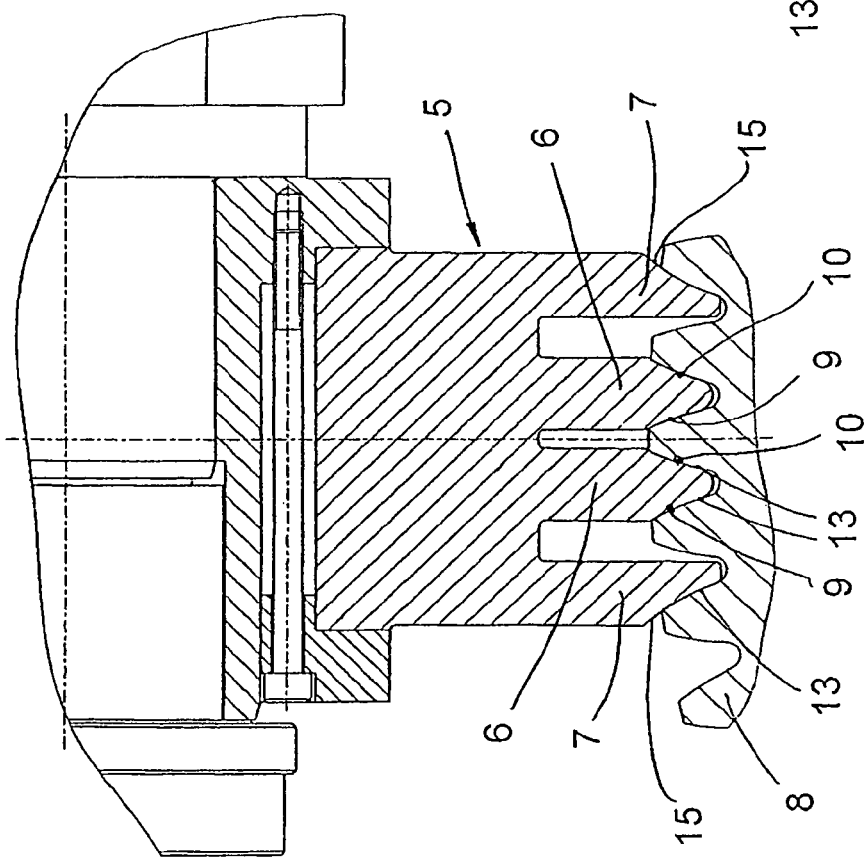
FIG. 6 shows the tool of FIG. 5 during finishing, with the tool flanks used for finishing belonging to adjacent disks.

With tools 5 according to FIGS. 5 and 6, the flanks 9, 10 of the tool 5, which are used for finishing, belong to adjacent disks 6 of the tool set (FIG. 6). This means that the situation is different here than with the state of the art; to generate gears with complicated flank modifications, this kind of tool requires software that is modified relative to the state of the art.

The tool 5 according to FIGS. 3 and 4, which is again designed symmetrically to the machine center 1, has three spaced apart side-by-side wide disks 6, which are arranged between the narrow disks 7 of the tool set. The tool flanks 9, 10 of the wide disks 6 and the tool flanks 15 of the narrow disks 7 are in engagement with the work piece flanks 13 during the rough machining process. During finishing (FIG. 4), only the flanks 9, 10 of the center wide disk 6 are in engagement with the work piece flanks 13, whereas the flanks 9, 10, 15 of the other disks 6, 7 are spaced apart from the work piece flanks 13. As with the embodiment in FIG. 2, the flanks 9, 10 belong to the same disk 6 of the tool set.

With the tool 5 according to FIGS. 5 and 6, two center wide disks 6 are provided, which are positioned between two narrow disks 7. Corresponding to the previous embodiments, the wide disks 6 have two respective tool flanks 9, 10, whereas the narrow disks 7 again have only one respective tool flank 15. During rough machining (FIG. 5), the disks 6, 7 and their tool flanks 9, 10, 15 are in engagement with the work piece flanks 13. During finishing (FIG. 6), only the immediately adjacent flanks 9, 10 of the two center wide disks 6 are in engagement with the two work piece flanks 13 of a work piece tooth 16. The other flanks 9, 10 of the two disks 6 are not in contact with the work piece flanks 13.

It is also possible to design tools that are not shown in the Figures. For example, it is possible to provide more than only two narrow disks 7 for a tool 5. It is also possible to use more than only two tool flanks 9, 10 for finishing. One condition for this, however, is that only simple flank modifications are required at the work piece 8, and that there is no excessive demand with respect to the geometric quality of the gearing and the number of work piece teeth is high, because otherwise, the cutting requirements at the various flanks 13 would be too different, and different flank roughness, different profile slope deviations and single pitch deviations would occur despite the same radial advancement of the tool 5.

There are complex engagement conditions associated with profile grinding of cylindrical gears. In this context, special significance is on the opening angle δ which is the angle between the tangent on the work piece flank 13 and the normal line on the rotary tool axis 2 in a contact point of the tangent (FIG. 3). This angle changes between base 11 and tip 12 of the work piece flank 13 and additionally with the position of the contact of the tangent point relative to the machine center 1. If said angle δ is smaller, the engagement conditions are less favorable. FIG. 3 shows said angle δ for two left flanks 13 of the work piece 8. In FIG. 3, the angle δ is approximately 30° in the right part of the representation, and only about 10° in the left part. In the left part of the representation according to FIG. 3, the angle δ is too small for a useful machining. This is why no contact with the tool 5 is desired here. Therefore, only a narrow disk 7 is provided in the corresponding tooth space 14. The narrow disk 7 is in contact only with the right work piece flank 13, where there is a sufficiently large opening angle.

FIG. 7 shows that the method in accordance with the invention can also be used for machining of internal gearings. The tool 5 has a wide disk 6 and two narrow disks 7. The tool 5 is shown at rough machining of the work piece 8. The two tool flanks 15 of the narrow disks 7 and the flanks 9 and 10 of the wide disk 6 are in contact with the work piece flanks 13. Similar to the explanation with FIGS. 1 and 2 for externally geared work pieces, the tool according to FIG. 7 can also be used for finishing of the flanks of internally geared work pieces. To that end, the tool flanks 15 of the narrow disks 7 are set back far enough that only the tool flanks 9, 10 of the wide disk 6 come into contact with the work piece flanks 13 of the adjacent work piece teeth 16.

In as far as the tools according to FIGS. 1 to 7 are assembled from a set of separate disks or disk sets, i.e., not produced from a common basic body, the disks used for rough machining and/or for finishing may have different grinding material specifications.

In one embodiment (not shown), different tools are used for rough machining and finishing. These tools have different specifications with respect to material and surface properties for the respective machining task. The different tools can be accommodated together on a spindle and moved into working position for machining. It is also possible to change the tools for the respective operation. The tool for finishing can have two or more flanks. In accordance with the invention, the tool for rough machining has a plurality of profiles arranged side-by-side in axial direction which are designed like the profiles of separately profiled grinding disks that are positioned at the appropriate places on the tool spindle.

Because only the toroidal surface area of the truer is used in conventional profiling of the tool, these truers are subject to significant wear and the profiling process is time consuming. These characteristics are also significant with respect to the inventive method because with the truing and/or re-profiling of the tool, clearly more volume must be machined off the tool. The above characteristics are improved significantly in that additional parts of the cylindrical surface area of the truer, which is directly adjacent to the toroidal surface area, may be used for the profiling process.

Truers 17 with a rotational axis 24 (FIG. 8) are used for profiling of a new tool and/or for re-profiling (e.g. for use with a work piece with changed gearing geometry). These tools generally work with only one toroidal surface area 18 and/or 21 per tool flank. They profile the respective tool flank in several work steps from base to tip, with "point contact." The toroidal surface areas 18, 21 are therefore subjected to high wear and the machining time is high. These conditions are improved considerably in that in addition to one of the toroidal surface areas 18, 21 a directly adjacent cylindrical surface area 19 is also used for truing. A large allowance is required to be able to use the cylindrical surface area 19 for removing material from the grinding disk 5, and the truing process must be performed in the direction from tip to base (see arrows in FIG. 8).

The truer 17 can execute a radial advancement movement, i.e. an advancement movement radial to the rotational axis 2 of the tool 5 (see arrow in FIG. 8), or be advanced via a track parallel to the final contour of the flanks 9 and/or 10 of the grinding tool 5. In the radial advancing movement, the radial advancement amount is adapted to the desired final contour of the flanks 9, 10. FIG. 8 shows the truer 17 at the end of a process step and in small sections 22, 23 at the end of additional process steps in machining of the flank 9. In this type of truing, the final contour of the respective tool flank is approximated step-wise.

The tool flank 10 is correspondingly machined mirror-symmetrically to the machining of the tool flank 9 with the second toroidal surface area 21 and the immediately adjacent cylindrical surface area 19 of the truer 17. Then the rough machining truing explained here is followed by a finishing truing; this is executed in the known manner with only one of the toroidal surface areas 18, 21 per tool flank.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method for discontinuous profile grinding tooth surfaces of externally and/or internally geared cylindrical gears, said method comprising:
    providing a tool having an envelope geometry comprising that of a plurality of profile disks arranged side-by-side with said plurality of profile disks further defining a plurality of tool flank surfaces, wherein said tool flank surfaces can be trued and re-profiled;
    rough grinding said tooth surfaces utilizing two or more of said tool flank surfaces;
    truing and re-profiling said tool flank surfaces whereby a portion of said plurality of tool flank surfaces are trued for subsequent finish grinding of said tooth surfaces and the remainder of said plurality of tool flank surfaces are re-profiled so that they do not come into contact with said tooth surfaces during said subsequent finish grinding;
    finish grinding said tooth surfaces.

2. The method of claim 1 wherein the tool flanks not needed for finishing are re-profiled so that they do not come into contact with the tooth surfaces during finishing, but take the position required for the next rough grinding process.

3. The method of claim 1 wherein the truing and/or re-profiling of the tool is done on a gear processing machine.

4. The method of claim 1 wherein for finishing, only two flanks of the tool are used which belong to the same disk of the disk set so that predetermined tooth flank modifications of the tooth surfaces can be generated.

5. The method of claim 1 wherein for finishing, only two flanks of the tool are used wherein said two flanks belong to adjacent disks of the disk set.

6. The method of claim 1 wherein subsequent to finish grinding but before the beginning of the next rough grinding process, the gear tooth surfaces are rotated by the number of tool flanks surfaces active in the rough grinding and/or finish grinding divided by two.

7. A method for discontinuous profile grinding tooth surfaces of externally and/or internally geared cylindrical gears, said method comprising:
    providing a tool comprising a plurality of profile grinding disks arranged side-by-side in an axial direction to form a set of disks with said plurality of profile disks further defining a plurality of tool flank surfaces, wherein said tool flank surfaces can be trued and re-profiled;

providing one disk of said plurality of disks having a specification that is especially suited for finish grinding;

providing the remainder of said plurality of disks each having a specification that is especially suited for rough grinding, wherein tool flank surfaces of the finish grinding disk are set back with respect to the tool flank surfaces of said remainder of rough grinding disks whereby during rough grinding, the tool flank surfaces of the finish grinding disk do not come into contact with said tooth surfaces;

rough grinding said tooth surfaces with the rough grinding disks;

re-profiling said remainder of rough grinding disks whereby tool flank surfaces of the rough grinding disk are set back with respect to the tool flank surfaces of said finish grinding disks whereby during finish grinding, the tool flank surfaces of the rough grinding disks do not come into contact with said tooth surfaces;

finish grinding said tooth surfaces with said finish grinding disk.

8. A method for discontinuous profile grinding tooth surfaces of externally and/or internally geared cylindrical gears, said method comprising:

providing a tool comprising a plurality of profile grinding disks arranged side-by-side in an axial direction to form a set of disks with said plurality of profile disks further defining a plurality of tool flank surfaces, wherein said tool flank surfaces can be trued and re-profiled;

providing at least two disks of said plurality of disks having a specification that is especially suited for finish grinding;

providing the remainder of said plurality of disks each having a specification that is especially suited for rough grinding, wherein tool flank surfaces of the at least two finish grinding disks are set back with respect to the tool flank surfaces of said remainder of rough grinding disks whereby during rough grinding, the tool flank surfaces of the at least two finish grinding disks do not come into contact with said tooth surfaces;

rough grinding said tooth surfaces with said rough grinding disks;

re-profiling said rough grinding disks whereby tool flank surfaces of the rough grinding disk are set back with respect to the tool flank surfaces of said at least two finish grinding disks whereby during finish grinding, the tool flank surfaces of the rough grinding disks do not come into contact with said tooth surfaces;

finish grinding said tooth surfaces with said at least two finish grinding disks.

* * * * *